(12) United States Patent
Létant et al.

(10) Patent No.: US 7,851,203 B2
(45) Date of Patent: *Dec. 14, 2010

(54) FUNCTIONALIZED APERTURES FOR THE DETECTION OF CHEMICAL AND BIOLOGICAL MATERIALS

(75) Inventors: Sonia E. Létant, Livermore, CA (US); Anthony W. van Buuren, Livermore, CA (US); Louis J. Terminello, Danville, CA (US); Michael P. Thelen, Danville, CA (US); Louisa J. Hope-Weeks, Brentwood, CA (US); Bradley R. Hart, Brentwood, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1232 days.

This patent is subject to a terminal disclaimer.

(21) Appl. No.: 10/677,395

(22) Filed: Oct. 1, 2003

(65) Prior Publication Data

US 2005/0074778 A1 Apr. 7, 2005

(51) Int. Cl.
  *C12M 1/34* (2006.01)
  *C12M 3/00* (2006.01)
  *C12M 1/00* (2006.01)
  *C12Q 1/68* (2006.01)
  *C12Q 1/00* (2006.01)

(52) U.S. Cl. ............ 435/287.2; 435/6; 435/287.1; 204/403.06; 205/778

(58) Field of Classification Search .......... None
See application file for complete search history.

(56) References Cited

U.S. PATENT DOCUMENTS 5,104,820 A * 4/1992 Go et al. ............ 438/109
5,843,767 A * 12/1998 Beattie ............ 435/287.1
2002/0191884 A1* 12/2002 Letant et al. ............ 385/12

FOREIGN PATENT DOCUMENTS

WO  WO 00/79257 A1 * 12/2000

OTHER PUBLICATIONS

Akeson et al, Biophys. J., vol. 77, pp. 3227-3233 (1999).*
Hoger, J. Polymer Sci. Part A: Poly. Chem., vol. 37, pp. 2685-2698 (1999).*
Letant et al (Nature Materials, vol. 2, pp. 391-395 (Jun. 2003).*
Stryer, Biochemistry, 2nd ed., pp. 13-15 and 575 (1981).*
Stryer, Biochemistry, 2nd ed, W.H.Freeman and Co., New York, pp. 17 and 576 (1981).*

* cited by examiner

*Primary Examiner*—Robert T. Crow
(74) *Attorney, Agent, or Firm*—John H. Lee; James S. Tak

(57) ABSTRACT

Disclosed are nanometer to micron scale functionalized apertures constructed on a substrate made of glass, carbon, semiconductors or polymeric materials that allow for the real time detection of biological materials or chemical moieties. Many apertures can exist on one substrate allowing for the simultaneous detection of numerous chemical and biological molecules. One embodiment features a macrocyclic ring attached to cross-linkers, wherein the macrocyclic ring has a biological or chemical probe extending through the aperture. Another embodiment achieves functionalization by attaching chemical or biological anchors directly to the walls of the apertures via cross-linkers.

14 Claims, 9 Drawing Sheets (a) Methanol, $H_2SO_4$ ; (b) $PdCl_2(PPh_3)_2$, CuI, diethylamine, TMSC≡CH; (c) methanol, NaOH; (d) $PdCl_2(PPh_3)_2$, CuI, diethylamine, 4-iodophenylacetylene; (e) $PdCl_2(PPh_3)_2$, CuI, diethylamine, 4-triazenephenylacetylene; (f) MeI (a) PdCl$_2$(PPh$_3$)$_2$, CuI, diethylamine; (b) methanol, NaOH; (c) PdCl$_2$(PPh$_3$)$_2$, CuI, diethylamine, compound 4b; (d) MeI; (e) PdCl$_2$(PPh$_3$)$_2$, CuI, diethylamine, compound 4a

(a) PdCl$_2$(PPh$_3$)$_2$, CuI, diethylamine; (b) methanol, NaOH; (c) MeI; (d) PdCl$_2$(PPh$_3$)$_2$, CuI, diethylamine, highly dilute concentrations

FUNCTIONALIZED APERTURES FOR THE DETECTION OF CHEMICAL AND BIOLOGICAL MATERIALS The United States Government has rights in this invention pursuant to Contract No. W-7405-ENG-48 between the United States Department of Energy and the University of California for the operation of Lawrence Livermore National Laboratory.

BACKGROUND

The detection and identification of biological materials based on genomic DNA is primarily dependent on PCR analysis detection methods. PCR analysis, however, requires replicating many copies of the DNA sequence that acts as a signature or marker for the biological material being targeted.

SUMMARY OF THE INVENTION

An aspect of this invention is an aperture on a substrate consisting of glass, carbon, polymeric materials, or semiconductors the entire surface of which is treated with crosslinkers and is functionalized by means of a macro-cylic ring deposited at one end of the aperture to which is attached a chemical or biological probe.

Another aspect of this invention is an aperture on a substrate consisting of glass, carbon, polymeric materials, or semiconductors the entire surface of which is treated with crosslinkers and is functionalized by means of antibodies or chemical functional groups deposited around the entire surface of the aperture.

Another embodiment of the invention is a method of using an aperture functionalized to bind to a specific biological or chemical moiety by passing a sample through said aperture while simultaneously measuring the ionic current across the depth of said aperture.

DETAILED DESCRIPTION

Figure 1A:
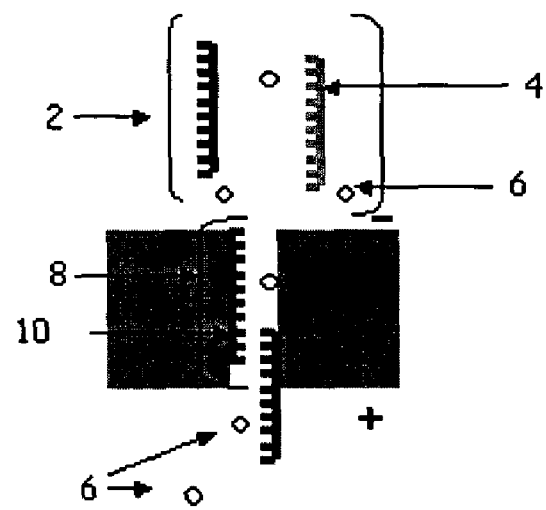
FIG. 1A: Shows an aperture functionalized with a DNA probe where there is no target present.

Disclosed herein are nanometer to micron scale functionalized apertures constructed on a substrate made of glass, carbon, semiconductors (e.g., silicon), or polymeric materials that will allow for the real time detection of biological materials without the need for PCR. This same technology can be used for the real time detection of chemical materials. In one embodiment, a macro-cyclic ring is placed over a nanometer scale aperture and acts as an anchor for a biological or chemical probe that is specific to a targeted biological or chemical material. The variation in ionic current across the aperture is measured and indicates whether the target material is binding to the probe. Biological probes comprising DNA strands complimentary to target DNA sequences are used to target DNA sequences, so a measured variation in ionic current across the top and bottom of the aperture indicates the presence of the target DNA sequence. Thus, only one strand of the target DNA sequence in a given sample is needed in order for this detection method to work. Chemical probes attached to a macro-cyclic ring also allow for the detection of a variety of different chemical materials, agents and ions.

Additionally, a functionalized aperture can be utilized without a macro-cyclic ring. In this embodiment, the walls of the aperture are functionalized with various chemical or biological anchors via cross linkers to reduce the speed at which a biological or chemical material will traverse from the top through the bottom of the aperture. By detecting the variation in ionic current between the top and bottom of the aperture as the materials traverses the aperture, the number of materials present can be counted. This allows, for example, the real time detection and counting of the number of cells, bacteria, viruses, proteins and peptides in a given sample of material.

Nanoscale to microscale apertures can be manufactured by Focused Ion Beam (FIB) drilling on a variety of substrates such as glass (See Storm A. J. et al., 'Fabrication of solid-state nanopores with single nanometre precision', *Nature Materials* 2, 537-540, 2003.), and polymeric materials (see Siwy, Z. & Fulinski, A. Fabrication of a synthetic ion pump. *Phys. Rev. Lett.* 89, 198103-198106, 2002. The fabrication method using FIB on polymeric and glass substrates is identical to the fabrication technique when using FIB on carbon or semiconductor substrates. Fabrication of apertures using carbon and semiconductors (e.g., silicon) can be undertaken by FIB or electrochemical etching (See Li, J. et al. "Ion-beam sculpting at nanometre length scales," *Nature* 412, 166-169, 2001; Saleh, O. A. et al., 'An artificial nanopore for molecular sensing', *NanoLetters* 3, 37-38, 2003.)

As the apertures are nanometers to micrometers in width, it is possible that many thousands of them can be created on a single substrate such as a silicon micro-chip semiconductor wafer. Accordingly, a single wafer may hold hundreds or thousands of apertures to simultaneously detect many different biological and/or chemical materials.

The concept of DNA sequencing and identification with a functionalized aperture relies on forcing an unknown single DNA strand through a molecular sized aperture that has been functionalized with a probe DNA strand. As the unknown strand of DNA passes through the aperture, it will bind with the DNA probe, if the DNA sequences are complementary, and then be released.

Figure 1B:
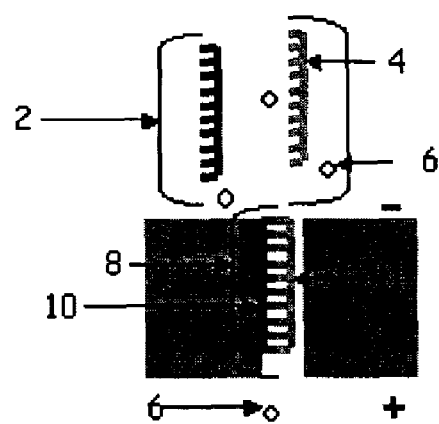
FIG. 1B: Shows an aperture functionalized with a DNA probe where the target is present and bound to the DNA probe
Figure 2:
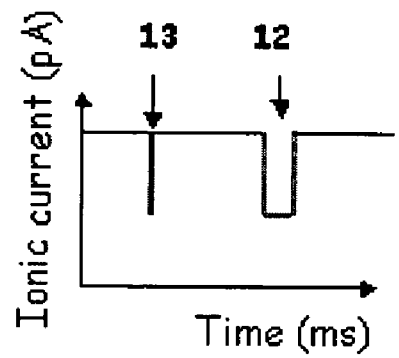
FIG. 2: Shows the prolonged decrease in ionic current as measured over time across the surfaces of the aperture when a target binds to the probe.

The interaction time between two complementary DNA strands is longer than between mismatched DNA strands. This interaction time can be determined by continuously measuring the ionic current, the number of ions moving through the aperture by unit time, from the top of the aperture through to the bottom of the aperture. When the strand to be analyzed enters the aperture, the ionic flow is obstructed and the current drops. The duration of the drop can be correlated with the affinity between the probe DNA strand anchored in the aperture and the unknown DNA strand moving through the aperture. Referring to the schematic diagram of FIGS. 1a and 1b, a solution to be analyzed 2 containing DNA 4 and ions 6 pass through a functionalized aperture 8 containing a DNA probe 10 complementary to a target DNA 11 (not present in FIG. 1a). FIG. 1a shows the case where the target DNA was not present in the sample and no binding to probe 10 occurs. FIG. 1b shows the case where target DNA 11 is present in the sample and binds to probe 10. Referring to FIG. 2, a schematic diagram of the analysis depicted in FIGS. 1a and 1b are shown. Plotting ionic current versus time shows a prolonged decrease in ionic current 12 in the case when binding to probe 10 occurs (FIG. 1b) as opposed to a brief drop in ionic current 13 in the case when non-target DNA passes through aperture 8 without binding to probe 10 (FIG. 1a).

Figure 3:
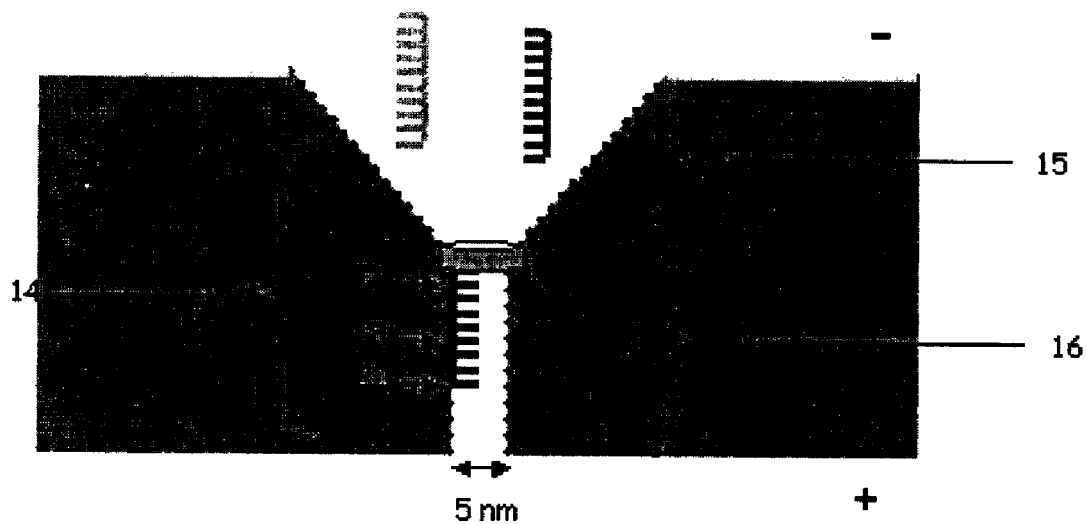
FIG. 3: Shows an aperture tapered at one end that has been functionalized with a DNA probe that is held in place at one end of the aperture by means of a macro-cyclic ring.

FIG. 3 shows an example of an aperture 14 comprising a tapered portion 15 and a cylindrical portion 16, a macro-cycle 17 with a single DNA strand 18 attached (e.g., the DNA signature for anthrax). Referring to FIG. 3, macro-cycle 17 is locked into place around one end of the cylindrical portion 16 such that a single DNA strand 18 is affixed to an inner wall 20 of the cylindrical portion 16. The negatively charged DNA-functionalized macro-cycle 14 is positioned by applying a mild electric field across the aperture (electrophoresis). When using a macro-cycle with a DNA probe the diameter of the ring may be exactly the same as that of the aperture at the transition point between the tapered and cylindrical portion of the aperture and may be sited at exactly that point in the aperture. Alternatively, the macro-cycle could be greater in diameter than the diameter of the aperture at the transition point between the tapered and cylindrical portion of the aperture and may be sited on the tapered portion of the aperture such that at least fifty percent of the DNA probe is located within the walls of the aperture. When using a cyclodextrin with a chemical probe, the ring must be placed at exactly the transition point between the tapered and cylindrical portion of the aperture and the entire chemical probe must be located within the cylindrical portion of the aperture. The cyclodextrin in such an embodiment of the invention must have a diameter identical to the diameter of the aperture at the transition point between the tapered and cylindrical portions of the aperture. This same principle of having a target-specific moiety locked in place along the inner wall of the aperture can be applied to other biological materials such as cells, bacteria, proteins and peptides, as well as chemical materials and ions such as arsenic in water.

Two main approaches have been previously taken to developing a functionalized aperture: (1) using a biological aperture (e.g., a cellular membrane protein); or, (2) machining an aperture in a solid matrix. As an example of the first approach, α-hemolysin, a protein extracted from *Staphylococcus aureus*, is used as a nanochannel. α-hemolysin self-assembles in lipid bilayers to form an aperture with a limiting aperture of 1.5 nm. In "Sequence-specific detection of individual DNA strands using engineered nanopores," *Nature Biotech.* 19, 636-639, 2001, Howorka, S., Cheley, S. & Bayley, H. showed that DNA oligonucleotides could be immobilized in α-hemolysin apertures via an hexamethylene linker and a disulfide bond and that binding events were longer for complementary strands than for mismatched ones. (See also Vercoutere, W. et al., "Rapid discrimination among individual DNA hairpin molecules at single-nucleotide resolution using an ion channel," *Nature Biotech.* 19, 248-252, 2001.) A limitation with this technique is that the lifetime of the device is only a few hours. A more stable environment is provided by using a solid support instead of a lipid bilayer, thereby increasing the longevity of the device.

In the second approach, apertures are built in a solid matrix. The smallest apertures reported have diameters of 2 nm and were made by ion beam sculpting in a pre-patterned $Si_3N_4$ membrane or by ion track etching on polycarbonate films. (See Li, J. et al. "Ion-beam sculpting at nanometre length scales," *Nature* 412, 166-169, 2001; and Siwy, Z. & Fulinski, A. Fabrication of a synthetic ion pump. *Phys. Rev. Lett.* 89, 198103-198106, 2002.

The apertures attained by the two above-described approaches are obtained by a very expensive and time consuming method. In addition, they have no surface chemistry available to attach DNA probe strands on their surfaces. Without the DNA probe, the aperture has no biological or chemical selectivity and thereby no sensitivity to a specific DNA sequence.

The problems inherent in the above techniques are overcome by creating apertures in a silicon matrix (e.g., a microchip wafer), treating the entire surface or walls of the aperture with cross linkers, and functionalizing the apertures with a macro-cyclic ring having a DNA probe specific to a particular DNA sequence attached to it. Silicon is a rigid and durable membrane in contrast to fluid lipid bilayers. The electrochemical processing of the silicon wafers is fast and inexpensive in contrast to ion beam drilling. Focused Ion Beam drilling of the silicon wafers, on the other hand, is slower and more expensive, but can also be readily utilized to create the apertures. The apertures disclosed herein also may be functionalized without using a macro-cyclic ring. In this embodiment, the entire surface or walls of the aperture are treated with cross linkers and then the surface of the aperture is coated with a material such as real or synthetic antibodies. Biological apertures that require gene mutations in order to be functionalized are not needed. These functionalizing methods, transform the apertures into extremely selective sensors that are able to detect, identify and count: (1) single DNA molecules or a specific DNA sequence in real time; (2) cells, bacteria, viruses, peptides, if specific antibody probes are attached to the aperture walls, and (3) chemical materials, if specific chemical probes are attached to the macro-cyclic ring or directly to the cross linkers on the aperture walls.

Aperture Design and Construction

Figure 4:
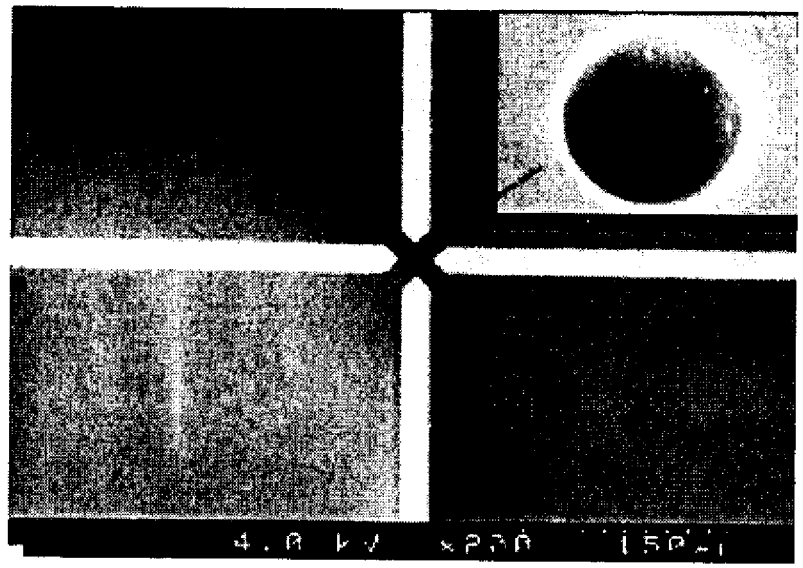
FIG. 4: Shows the design of the FIB processing. Chrome locator lines deposited on top of a silicon nitride layer point to a single pit on a thinned Silicon On Insulator (SOI) wafer.
Figure 5:
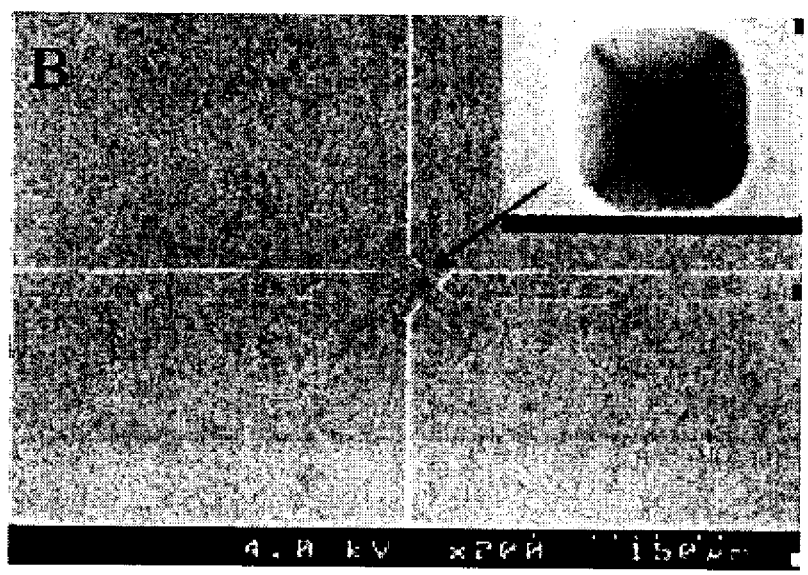
FIG. 5: Shows the design for electrochemical processing. Etched locator lines buried under a silicon nitride layer point to a single pit on a thinned silicon wafer.
Figure 6:
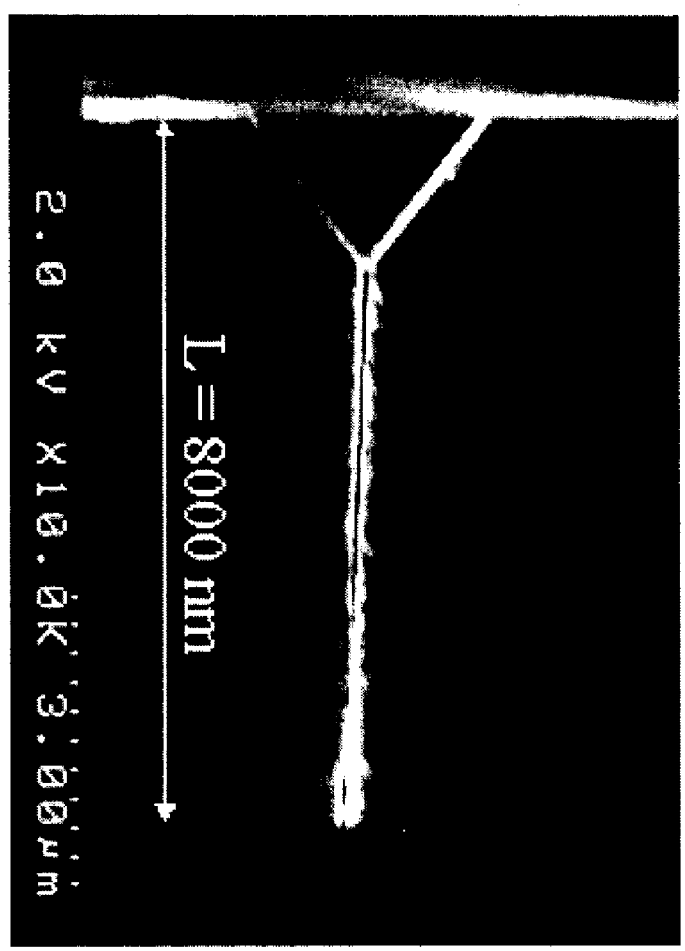
FIG. 6: Shows apertures that were prepared using the electrochemical etching technique with a top diameter of 10 nm and a length of 8 µm.

As mentioned, two different approaches to building apertures on silicon are disclosed herein, i.e., electrochemical etching and Focused Ion Beam (FIB) drilling. Two different series of silicon devices, each one optimized for a specific processing technique were designed and fabricated. In both methods the starting point for fabrication was the use of a pre-patterned silicon device. The pre-patterned devices were made using standard photolithography techniques to create an inverted pyramid on the top of the substrate and to thin that area on the bottom of the substrate. The top pit and the thinned area of the substrate were then used as the starting point for the drilling of the aperture using an ion beam or for the etching of the aperture by electrochemistry. Referring to FIGS. 4 and 5, the pre-patterned devices have been characterized by Field Emission Scanning Electron Microscopy (FESEM). FIGS. 4 and 5 show top FESEM views of pre-patterned silicon devices. FIG. 4 shows the design for FIB processing. Chrome locator lines deposited on top of a silicon nitride layer point to a single pit on a thinned Silicon On Insulator (SOI) wafer. FIG. 5 shows the design for electrochemical processing. Etched locator lines buried under a silicon nitride layer point to a single pit on a thinned silicon wafer. Referring to FIG. 6, Apertures were prepared using the electrochemical etching technique with a top diameter of 10 nm and a length of 8 µm.

Figure 7A:
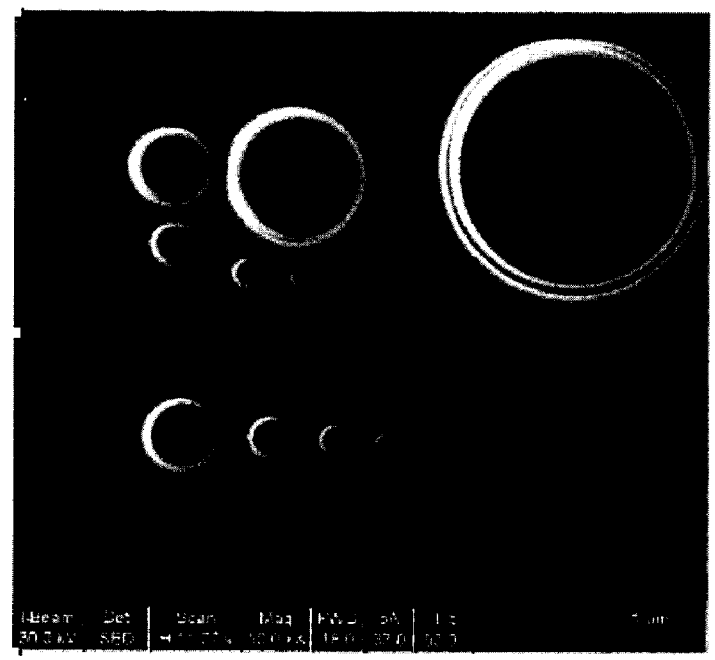
FIGS. 7a and 7b: Shows top views of apertures of various sizes prepared by FIB drilling.
Figure 7B:
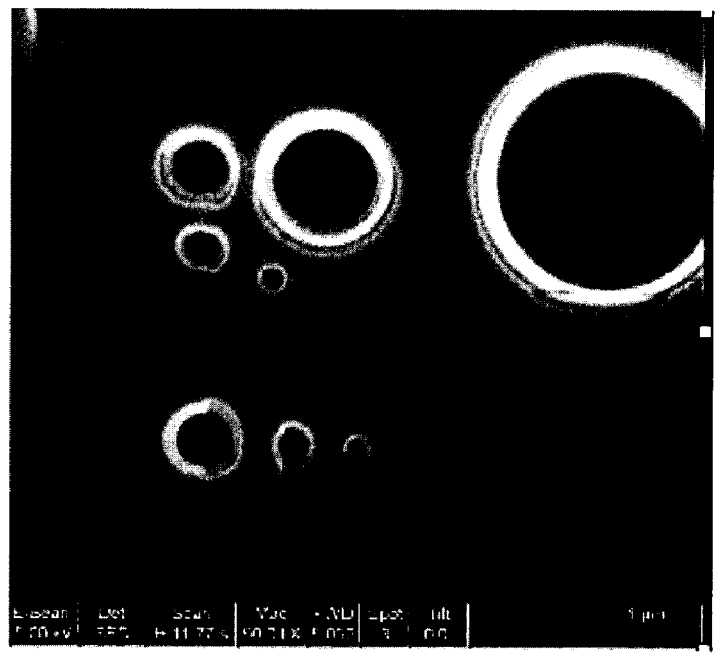

The aspect ratio for these apertures is in the order of 500. FIB was conducted at the National Center for Electron Microscopy (NCEM) at Lawrence Berkeley National Laboratory (LBNL). Using FIB, apertures as small as 22 nm in diameter have been fabricated. FIGS. 7a and 7b show FESEM top views of through apertures prepared by FIB drilling. The thickness of the Silicon on Oxide (SOI) silicon membrane is 4 µm, the aspect ratio obtained is about 100, a number well above the standard aspect ratio for FIB drilling which is routinely around 10. These aspect ratios have been achieved through a perfect alignment of both electron and ion beams and a detailed beam current/beam spot size/drilled hole size calibration.

Examples of Aperture Fabrication

Aperture Fabrication by Electrochemistry

Step 1: pre-patterning by standard micro-fabrication. N-type, Phosphorus doped, (100) oriented silicon wafers with a resistively of 2 Ω·cm and an initial thickness of 300 µm were pre-patterned on both sides by standard contact photolithography. A thick layer of silicon nitride (0.6 µm) was grown on the surface of the silicon wafers by low-pressure chemical vapor deposition (LPCVD) and the top and bottom patterns were defined by plasma etch. The top pattern consists of 2×2 µm square fully etched with potassium hydroxide (KOH) in order to form a pyramid. It constitutes the nucleation site for the growth of the aperture. Locator lines etched in silicon and then buried under silicon nitride provide a means for finding and visualizing the single aperture. The bottom pattern consists of 1×1 mm square window etched in KOH in order to thin the silicon wafer from 300 down to 10 µm or thinner.

Step 2: electrochemical etching. Silicon apertures were prepared by break-down electrochemical etch of pre-patterned silicon samples. The samples were mounted in an electrochemical cell and connected to a potentiostat. The electrolyte solution was a mixture of de-ionized water (94% per volume) and hydrofluoric acid (HF) (6% by volume). Approximately 0.5 mL of surfactant (Ilfotol™) was added for every 250 mL of solution prepared. The counter electrode was a platinum coil immersed in the electrolyte and the work electrode was connected to the sample via gallium-indium eutectic paste that provides an ohmic contact. A 7 V bias was applied across the sample to generate the positive charges required for the dissolution of silicon in the presence of HF. The electrochemical dissolution reaction is localized at the tip of the nucleation pit by the electric field. Moreover, the single square pit is the only silicon surface exposed to the electrolyte: the rest of the sample is protected by the silicon nitride layer.

Apertures with a top diameter of 10 nm and an aspect ratio of 500 were produced by this technique (See FIG. 6).

The aperture diameter can be made larger or smaller by adjusting the HF concentration and the bias. The bias is the voltage applied across the sample during the electrochemical etch. The higher the bias, the higher the electric field resulting in a greater number of charges collected at the pore tip. The number of silicon atoms removed varies with the number of positive charges collected. Therefore, decreasing the bias results in fewer charges that remove fewer silicon atoms resulting in a smaller aperture diameter. Similarly, decreasing the HF concentration slows down the reaction and the number of silicon atoms removed per unit time is decreased resulting in a smaller aperture diameter. Adjusting the bias and the HF concentrations will allow the fabrication of pore diameters as small as 1 nm. An alternative method of creating extremely small aperture diameters is to start from a larger aperture and then to grow thermal oxide in a furnace under oxygen or air at temperatures between 400 and 1100° C. in order to reduce the aperture diameter.

Aperture Fabrication by Focused Ion Beam

Step 1: pre-patterning by standard micro-fabrication. Undoped, (100) oriented SOI wafers with a wafer thickness of 300 µm and a device layer of 3.5 µm were pre-patterned on both sides by standard contact photolithography. A thick layer of silicon nitride (0.6 µm) was grown on the surface of the silicon wafers by low pressure chemical vapor deposition (LPCVD) and the top and bottom patterns were defined by plasma etch. The top pattern consists of 2×2 µm square fully etched with potassium hydroxide (KOH) in order to form an inverted pyramid. This top pit constitutes the nucleation site for the growth of the aperture. Chrome locator lines deposited on the silicon nitride layer provide a means for finding and visualizing the single aperture and can be removed later with a chrome etch solution. The bottom pattern consists of 1×1 mm square window etched by deep reactive ion etch (DRIE) in order to thin the silicon wafer from 300 µm down to the device layer of 3.5 µm.

Step 2: Focused ion beam drilling. The samples were mounted on a sample holder and introduced in the FIB chamber. A working distance of 5 mm was used.

Examples of beam parameters/aperture diameters include the following: (1) Ion beam current: 300 pA, Ion beam energy: 30 kV, Ion beam spot size: 1 µm, Ion beam shape: circular tool, Drilling depth: 5 µm, Aperture diameter: 1 µm; (2) Ion beam current: 50 pA, Ion beam energy: 30 kV, Ion beam spot size: 0.25 µm, Ion beam shape: circular tool, Drilling depth: 5 µm, Aperture diameter: 0.25 µm; and (3) Ion beam current: 30 pA, Ion beam energy: 30 kV, Ion beam spot size: 0.01 µm, Ion beam shape: circular tool, Drilling depth: 5 µm, Aperture diameter: 0.02 µm.

Smaller diameters will be achieved by decreasing the ion beam current. An advantage of the FIB is that the instrument allows silicon oxide to be grown in situ in the chamber in a controlled fashion. One can then start from a larger aperture diameter and shrink it to the desired size by growing silicon oxide on the silicon aperture walls. To do this, water vapor is introduced in the FIB chamber with a heated water crucible. Controlled oxide growth is obtained with the ion beam: the oxide will grow only under the area covered by the ion beam.

An alternative technique is to build an ion detector and a feedback control loop in order to detect ions moving through the aperture. Such a detector, working in transmission across the silicon sample, would allow turning the ion beam off as soon as an aperture is opened. An aperture diameter of 1.8 nm has been fabricated with this technique by J. Li et al in, Ion-beam sculpting at nanometre length scale, J. Li, J. Stein, C. McMullan, D. Branton, M. J. Aziz and J. A. Golovchenko, Nature 412, 166-169 (2001), which is hereby incorporated by reference.

Macro-Cyclic Ring Design and Construction

Figure 8:
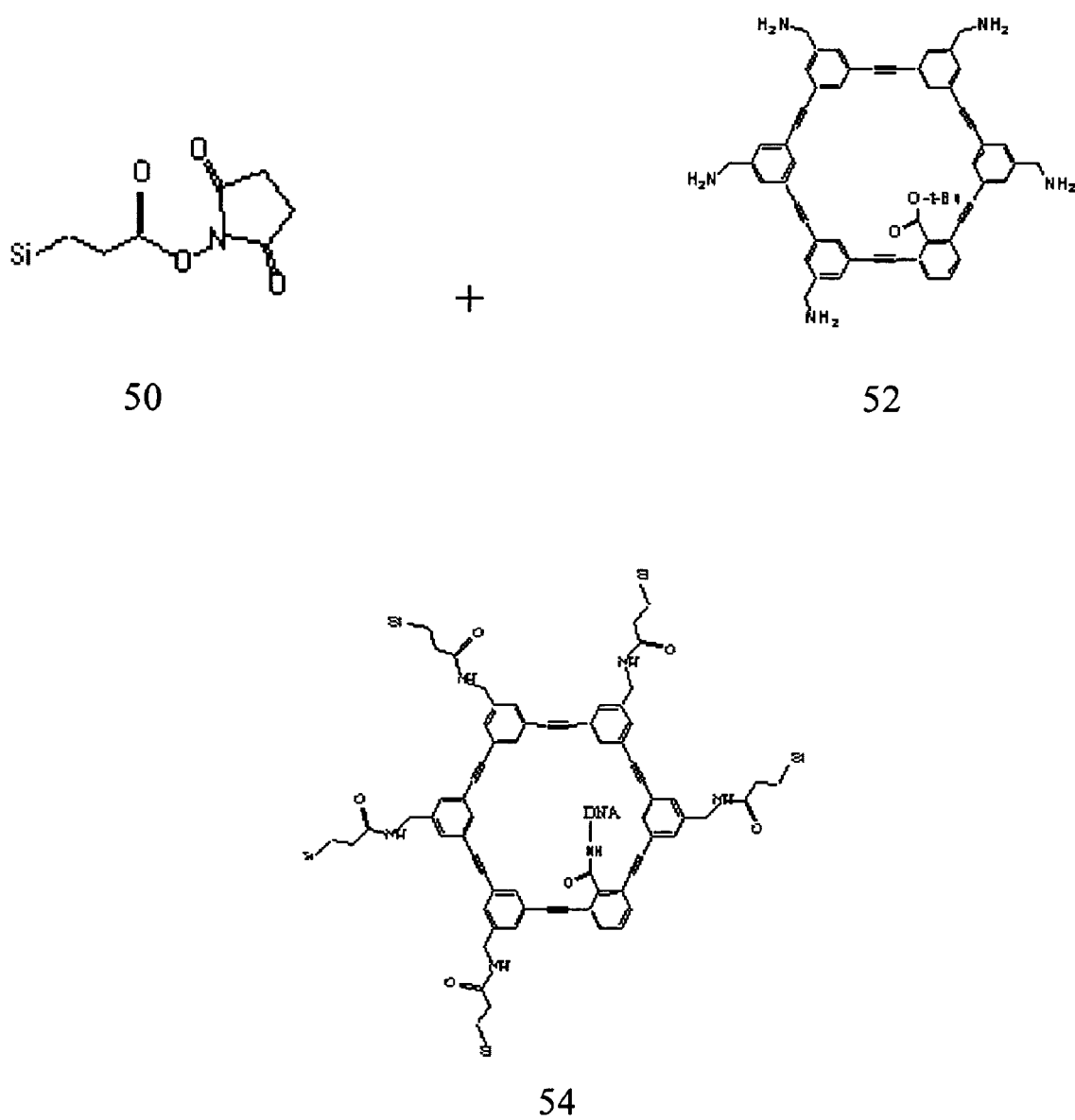
FIG. 8: Shows the means of functionalizing an aperture by creating a macro-cyclic ring using a rigid phenyl-ethylene backbone that is placed over the circumference of the aperture.

Referring to FIG. 8, the functionalization of the apertures is accomplished by macro-molecular chemistry. First, a functionalized silicon surface 50 is created. A macro-cycle geometry and composition is determined to provide the correct size and rigidity for DNA functionalization of an aperture. A macro-cyclic ring 52 is built using a rigid phenyl-ethylene backbone and is placed over the circumference of the aperture (as shown in FIGS. 1a and 1b) with nano-metric precision using electrophoresis in dilute solution such that it attaches to the silicon surface to form an anchored macro-cycle 54. The correct position of the functionalized macro-cyclic ring above the aperture can be controlled in situ by a continuous measurement of the ionic current during the reaction.

Examples of Macro-Cyclic Ring Fabrication

Macro-cyclic ring synthesis is described in Hoeger, S. "Highly efficient methods for the preparation of shape-persistent macrocyclics," *J. Polym. Sci. Part A: Polym. Chem.* 37, 2685-2698, 1999; Hoeger, S. & Meckenstock, A.-D., "Template-directed synthesis of shape-persistent macrocyclic amphiphiles with convergently arranged functionalities," *Chem. Eur. J.* 5, 1686-1691, 1999; and Jiang, H. & Lin, W., "Self-assembly of chiral molecular polygons," *J. Am. Chem. Soc.* 125, 8084-8085, 2003; which are hereby incorporated by reference.

Figure 9A:
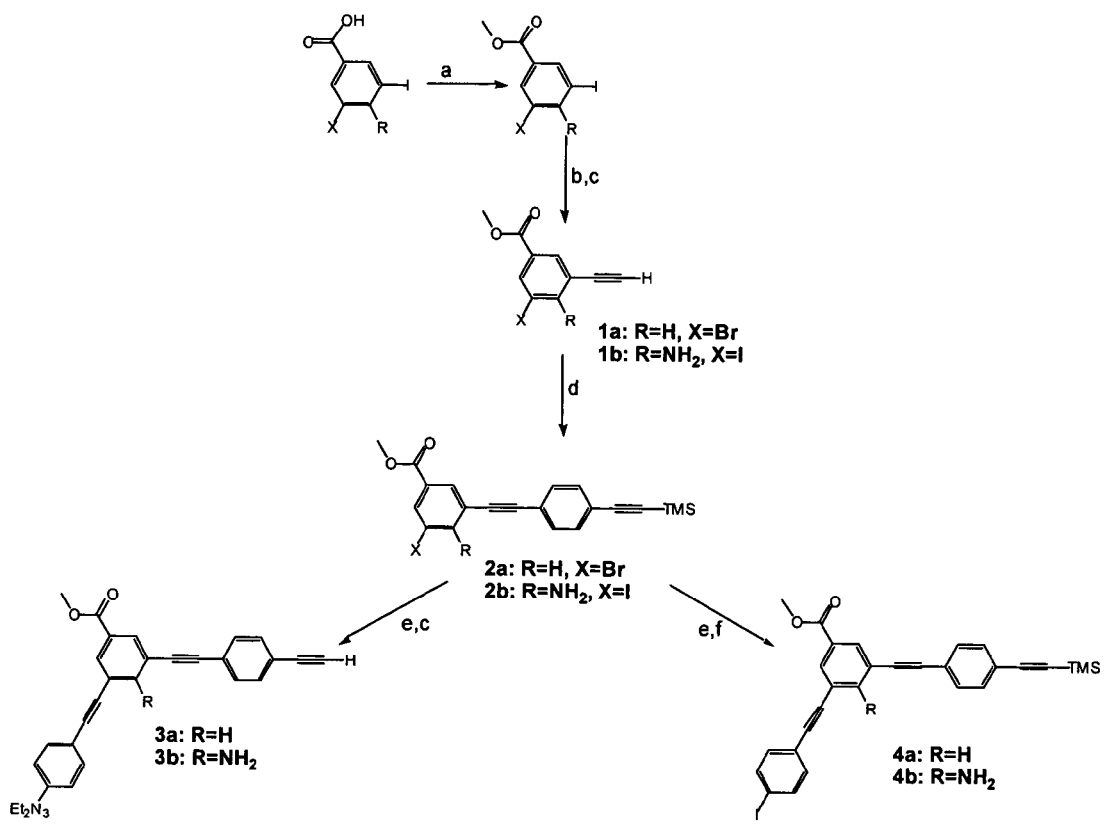
FIGS. 9a-c: Shows an example of the synthesis of a macro-cyclic ring.
Figure 9B:
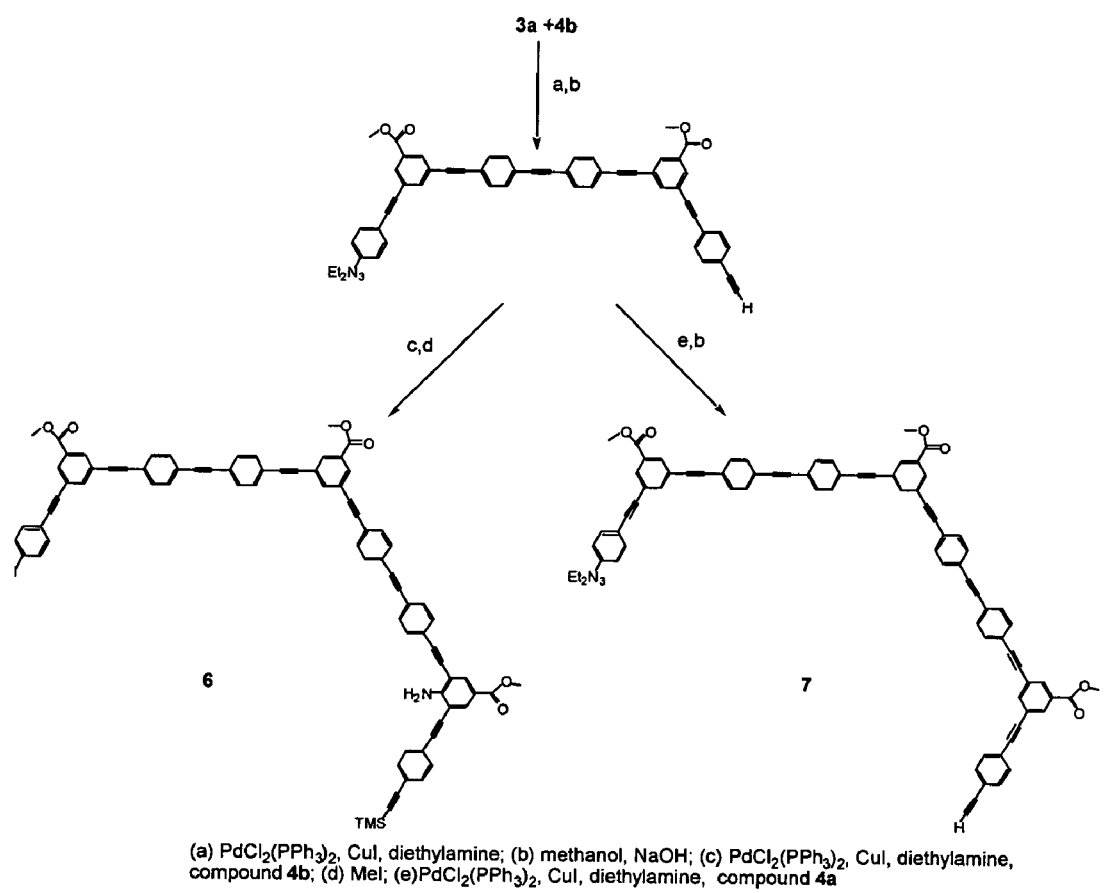
Figure 9C:
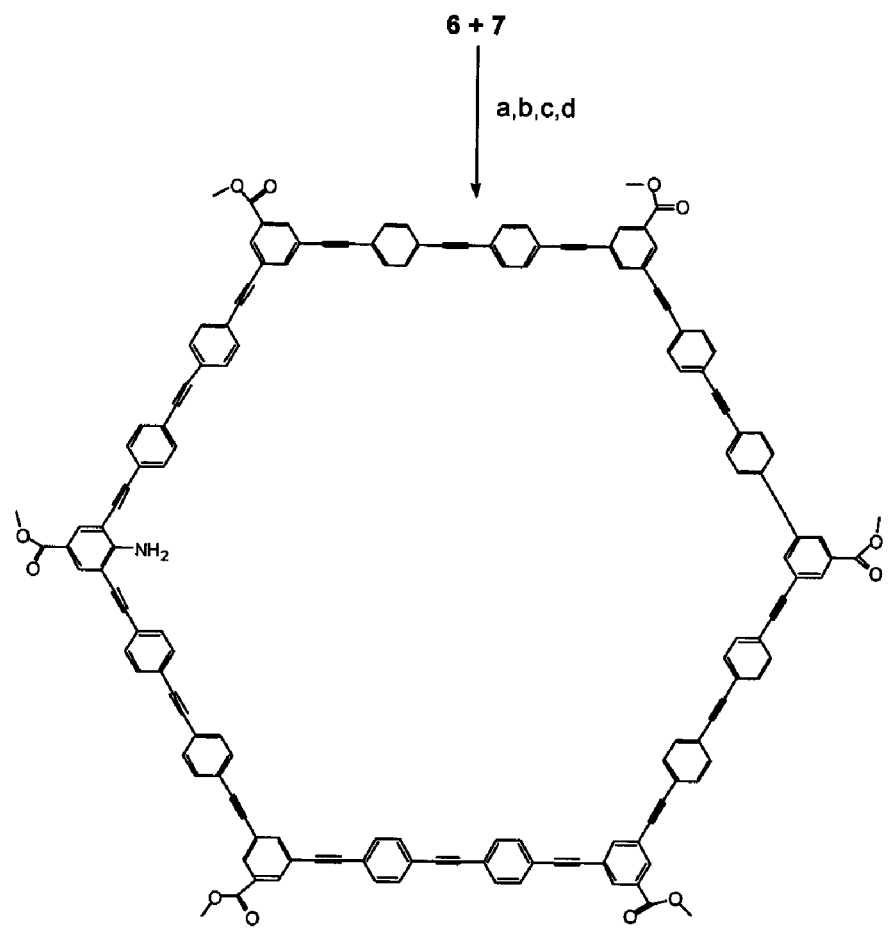

Treatment of 2,2'-diacetyl-1,1'-binaphthyl-6,6'-bis (ethyne), L-H2, with 1 equiv of trans-Pt(PEt3)2Cl2 led to a mixture of different sizes of chiral metallocycles [trans-(PEt3)2Pt(L)]n (n=3-8, 1-6). Each of the chiral molecular polygons 1-6 was purified by silica gel column chromatography and characterized by 1H, 13C{1H}, and 31P{1H} NMR spectroscopy, MS, IR, UV-vis, and circular dichroism spectroscopies, and microanalysis. The presence of tunable cavities (1.4-4.3 nm) and chiral functionalities in these molecular polygons promises to make them excellent receptors allowing for immobilization and identification of various biological and chemical materials. A synthesis scheme is shown in FIGS. 9a, 9b and 9c and described below.

Compound 1a) A 3-neck flask was charged with trimethylsilylacetylene (14.3 mmol, 1.41 g), 3-bromo-5-iodophenyl-methylester (14.3 mmol, 4.9 g), $PdCl_2(PPh_3)_2$ (0.143 mmol, 0.10 g) and CuI (0.143 mmol, 0.03 g), dry deoxygenated diethylamine (200 ml). After stirring for 12 hours at (25° C.), the solvent was evaporated and the residue extracted with diethylether. After evaporation the crude product was purified by column chromatography (Hexane:DCM, 4:1). The product was dissolved in methanol and excess sodium hydroxide was added and the suspension stirred at room temperature for 1 hour. The solvent was removed under vacuum. The residual solid was dissolved in dichloromethane and filtered through a plug of silica to give the product (69% yield).

Compound 1b) A 3-neck flask was charged with trimethylsilylacetylene (12.0 mmol, 1.22 g), 4-amino-3,5-di-iodophenyl-methylester (12.0 mmol, 5 g), $PdCl_2(PPh_3)_2$ (0.12 mmol, 0.084 g) and CuI (0.12 mmol, 0.022 g), dry deoxygenated diethylamine (200 ml). After stirring for 12 hours at (25° C.), the solvent was evaporated and the residue extracted with dichloromethane. After evaporation the crude product was purified by column chromatography (Hexane:DCM, 4:1). The product was dissolved in methanol and excess sodium hydroxide was added and the suspension stirred at room temperature for 1 hour. The solvent was removed under vacuum. The residual solid was dissolved in dichloromethane and filtered through a plug of silica to give the product (75% yield).

Compound 2a) A 3-neck flask was charged with 1-(4-iodophenyl)2-(trimethylsilyl)acetylene (2.09 mmol, 0.63 g), compound 1a (2.09 mmol, 0.5 g), $PdCl_2(PPh_3)_2$ (0.0209 mmol, 0.014 g) and CuI (0.0209 mmol, 0.004 g), dry deoxygenated diethylamine(180 ml) and dry deoxygenated benzene (20 ml). After stirring for 12 hours at (25° C.), the solvent was evaporated and the residue extracted with dichloromethane. After evaporation the crude product was purified by column chromatography (Hexane:DCM, 3:2) (58% yield).

Compound 2b) A 3-neck flask was charged with 1-(4-iodophenyl)2-(trimethylsilyl)acetylene (1.66 mmol, 0.50 g), compound 1b (1.66 mmol, 0.50 g), $PdCl_2(PPh_3)_2$ (0.0166 mmol, 0.011 g) and CuI (0.0166 mmol, 0.003 g), dry deoxygenated diethylamine (180 ml) and dry deoxygenated benzene (20 ml). After stirring for 12 hours at (25 C), the solvent was evaporated and the residue extracted with diethylether. After evaporation the crude product was purified by column chromatography (Hexane:DCM, 5:2) (29% yield).

Compound 3a) A 3-neck flask was charged with 4-triazenephenylacetylene (0.97 mmol, 0.20 g) compound 2a (0.97 mmol, 0.40 g), $PdCl_2(PPh_3)_2$ (0.0097 mmol, 0.007 g) and CuI (0.0097 mmol, 0.0019 g), dry deoxygenated diethylamine (150 ml) and dry deoxygenated benzene (50 ml). After stirring for 16 hours at (4° C.), the solvent was evaporated and the residue extracted with diethylether. After evaporation the crude product was purified by column chromatography (Hexane:DCM, 1:1). The product was dissolved in methanol and excess sodium hydroxide was added and the suspension stirred at room temperature for 1 hour. The solvent was removed under vacuum. The residual solid was dissolved in dichloromethane and filtered through a plug of silica to give the product. (60% yield).

Compound 3b) A 3-neck flask was charged with 4-triazenephenylacetylene (0.84 mmol, 0.17 g) compound 2b (0.84 mmol, 0.40 g), $PdCl_2(PPh_3)_2$ (0.0084 mmol, 0.006 g) and CuI (0.0084 mmol, 0.002 g), dry deoxygenated diethylamine (150 ml) and dry deoxygenated benzene (50 ml). After stirring for 16 hours at (3° C.), the solvent was evaporated and the residue extracted with diethylether. After evaporation the crude product was purified by column chromatography (Hexane:DCM, 1:1). The product was dissolved in methanol and excess sodium hydroxide was added and the suspension stirred at room temperature for 1 hour. The solvent was removed under vacuum. The residual solid was dissolved in dichloromethane and filtered through a plug of silica to give the product. (45% yield)

Compound 4a) A 3-neck flask was charged with 4-triazenephenylacetylene (0.97 mmol, 0.20 g) compound 2a (0.97 mmol, 0.40 g), $PdCl_2(PPh_3)_2$ (0.0097 mmol, 0.007 g) and CuI (0.0097 mmol, 0.0019 g), dry deoxygenated diethylamine (150 ml) and dry deoxygenated benzene (50 ml). After stirring for 16 hours at (4° C.), the solvent was evaporated and the residue extracted with diethylether. After evaporation the crude product was purified by column chromatography (Hexane:DCM, 1:1). The product was dissolved in methyl iodide and degassed three times and stirred at 110° C. for 12 hours. The unreacted methyl iodide was distilled out. The residual solid was dissolved in dichloromethane and filtered through a plug of silica to give the product. (52% yield).

Compound 4b) A 3-neck flask was charged with 4-triazenephenylacetylene (0.84 mmol, 0.17 g) compound 2b (0.84 mmol, 0.40 g), $PdCl_2(PPh_3)_2$ (0.0084 mmol, 0.006 g) and CuI (0.0084 mmol, 0.002 g), dry deoxygenated diethylamine (150 ml) and dry deoxygenated benzene (50 ml). After stirring for 16 hours at (3° C.), the solvent was evaporated and the residue extracted with diethylether. After evaporation the crude product was purified by column chromatography (Hexane:DCM, 1:1). The product was dissolved in methyl iodide and degassed three times and stirred at 110° C. for 12 hours. The unreacted methyl iodide was distilled out. The residual solid was dissolved in dichloromethane and filtered through a plug of silica to give the product. (38% yield).

The above-described synthetic process allows the synthesis of macro-cyclic rings of various sizes; larger macro-cyclic rings can be made by repeating the synthesis steps and increasing the length of the building blocks, thus adjusting the size of the ring to fit the diameter of the aperture.

Aperture Wall Functionalization with Biological or Chemical Cross Linkers Example 1

A silicon hydride surface is functionalized with cross linkers and a biotin antibody probe. The cross linkers are attached directly to the surface of the aperture and a biotin antibody is attached to the cross linker. Hydrosilylation of the silicon apertures was carried out in a round-bottom Schlenk type flask equipped with a single 24/40 taper joint and glass stopcock controlled side-arm. The samples were placed in the flask which was then sealed with a septum and purged with dry, oxygen-free nitrogen gas. 5-Hexynenitrile (0.10 mL, 0.95 mM) was added to the samples followed by the addition of a 1.0 M hexane solution of $EtAlCl_2$ (150 μL, 0.15 mM). After 3 hours at room temperature, the apertures were washed under a nitrogen atmosphere with tetrahydrofuran (THF), followed by $CH_2Cl_2$, followed by EtOH and then dried under vacuum. Reduction of the surface bound nitrile to a 1° amine was achieved by adding a 1.0 M diethyl ether solution of $LiAlH_4$ (150 μL, 0.15 mM). After 30 min at room temperature, the apertures were washed under a nitrogen atmosphere with THF (3×5 mL), followed by $CH_2Cl_2$ (3×5 mL) and EtOH (3×5 mL) then dried under a nitrogen stream followed by vacuum. The amino functionalized membranes were immersed in a solution of SPDP (2 mg, $6.4 \times 10^{-3}$ mM) in DMF under nitrogen and left to react for 3 h with occasional agitation. The remaining SPDP solution was removed and the samples were rinsed with DMF (3×5 mL) followed by ethanol (3×5 mL) then dried under a nitrogen stream followed by vacuum. The SPDP functionalized apertures were immersed in a solution of dithiothreitol (DTT) (15.4 mg, 0.1 mM) in 10% $EtOH/H_2O$ (10 mL) and left to react for 1 h with occasional agitation. The remaining DTT solution was removed and the parts were rinsed with fresh 10% $EtOH/H_2O$ (3×5 mL) then EtOH (5×5 mL) then dried under a nitrogen stream followed by vacuum. The sulfhydryl samples were immersed in a solution of GMBS (N-(γ-maleimidobutyryloxy)succinimide)) (2.0 mg, $7.1 \times 10^{-3}$ mM) in DMF under nitrogen and left to react for 3 h with occasional agitation. The remaining GMBS solution was removed and the samples were rinsed with DMF (3×5 mL), followed by EtOH (3×5 mL), then dried under a nitrogen stream followed by vacuum. The NHS-ester apertures were immersed in a solution of Biotin cadaverine (5.0 mg, 0.011 mM) in DMF under nitrogen and left to react overnight with occasional agitation. The remaining solution was removed and the samples were rinsed with DMF (5×5 mL) followed by ethanol (5×5 mL) then dried under a nitrogen stream followed by vacuum.

The attachment technique just described is general and can be employed to attach any kind of antibody, protein, enzyme or chemical receptor on the silicon aperture walls to allow binding and detection of biological or chemical materials. (See Hart, B. R. et al., 'New method for attachment of biomolecules to porous silicon', Chemical Communications 3, 322-323, 2003.)

Example 2

The standardized method for preparing surfaces for cross linkers is functionalization of the silicon oxide surface. The silicon walls of the aperture can be oxidized by ozone oxidation, thermal oxidation, or localized oxidation using the FIB. These three processes result in the generation of a hydroxylated silicon oxide surface, i.e., silanol bonds (Si—OH). The oxidation is followed by condensation of the silanol groups with functionalized silanes, as described in Janshoff et al., "Macroporous p-type silicon Fabry-Perot layers. Fabrication, characterization, and applications in biosensing," J. Am. Chem. Soc. 120, 12108-12116 (1998). Some examples of functionalized silanes include $R'R_2Si(OCH_3)$ where $R=CH_3$ and R'=a functional moiety such as, amine, thiol or modified ester. These functional groups can be reacted with cross linkers and then with biological or chemical anchors such as antibodies and cyclodextrins. Cross linkers are carbon chains with functional groups designed to bind two molecules together, or to bind a molecule to a surface. Dancil et al. have designed porous Si biosensors that can detect antibody-antigen binding with this technique (see Dancil et al, "A Porous Silicon Optical Biosensor: Detection of Reversible Binding of IgG to a Protein A-Modified Surface," J. Am. Chem. Soc. 121, 11491-11502, 1999).

Surface Characterization

Surface characterization measurements using atomic force microscopy (AFM), photoelectron spectroscopy (PES), soft X-ray fluorescence (SXF), X-ray absorption spectroscopy (XAS), Fourier Transform Infra Red Spectrometry (FTIR) and Mass Spectrometry (MALDI, MS) can be used to characterize the surface properties. This is an optional step in the process of attaching cross linkers. This process will determine whether the cross linkers and probes have been correctly attached to the surface of the aperture.

Method for Detection of Biological and Chemical Materials

Experimental Set Up

The experimental set up used for the current blockade measurements comprises a computer (e.g., Dell, Pentium 4), a patch clamp amplifier (e.g., HEKA, model EPC 10), a headstage (e.g., HEKA, model EPC10), a Faraday cage (e.g., Harvard apparatus, model FC-1), electrodes (e.g., Ag/AgCl), low noise cables and a sample cell. The sample cell is made out of PVC. The sample is held between two PVC walls and separates two reservoirs. One reservoir contains a 1 M aqueous solution of KCl and the organisms to analyze, and the other reservoir contains de-ionized water. The electrodes are immersed in each compartment of the cell in order to monitor the ionic current through the aperture. The signal amplified by the amplifier is analyzed and stored by the computer.

The experimental set up described above was tested with a single channel simulator (Harvard apparatus, model CM3/100). The electronic noise of the set up measured in air is 96 fA and current blockade events in the 10 pA and 1 ms regime are measured. The amplitudes of the measured events are two orders of magnitude lower than the amplitudes of the current blockade events reported for the biological and nitride apertures respectively obstructed by single or double stranded DNA molecules. The amplifier is operated in the voltage clamp mode. The typical voltage clamp applied is between 80 and 200 mV. Through electrochemistry and by FIB, aperture diameters as small as 10 nm and 22 nm, respectively, and up to 50 μm in diameter have been created. These apertures have been characterized using FESEM and have been tested using our experimental set up.

The aperture noise has been measured and optimized by avoiding surface charges on the device by coating it with an insulating layer of silicon oxide and silicon nitride. Permeation and current blockade measurements can be performed on unfunctionalized apertures first with charged viruses and then with DNA strands on which bulky chemical adducts or dyed beads have been anchored. Additionally, the macrocycle can be functionalized using various functional groups, such as amine and thiols, pointing inside and outside the ring. Additional groups can been added in order to optimize the solubility of the molecule as well as its binding to the silicon surface. Finally, a single strand of DNA from the Anthrax and Plague bacterium can be anchored in the macro-cycle to act as detectors and identifiers of these pathogens. The macro-cyclic rings with the DNA and chemical probes attached can be successfully anchored over the aperture to demonstrate the effectiveness of identifying biological and chemical materials.

Apertures can also be functionalized and used successfully without macro-cyclic rings. In this embodiment, the aperture is coated with natural or synthetic antibodies able to slow down viruses or bacteria according to the composition of their outer membrane. Using the experimental set up, we can use the apertures to work as counters of biological materials such as cells, bacteria, viruses, proteins, peptides and ions. Aperture walls can be functionalised to determine the interaction between simulated viruses and aperture wall surface. (See S. E. Létant et al., 'Functionalized silicon membranes for specific bio-organisms capture', Nature Materials 2, 391-395, 2003, All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in molecular biology, chemical synthesis or related fields are intended to be within the scope of the following claims.

The invention claimed is:

1. An apparatus comprising:
a substrate having at least one aperture having a tapered portion with a top diameter greater than a bottom diameter and wherein in each said at least one aperture, the tapered portion of each said at least one aperture transitions into a cylindrical portion having a diameter equal to said bottom diameter of said tapered portion;
cross-linkers attached to an inner wall of said at least one aperture; and
a macro-cyclic ring, having a diameter substantially the same as the diameter of the cylindrical portion of said at least one aperture, attached at or near the circumference of one end of the cylindrical portion of said at least one aperture.

2. The apparatus of claim 1, wherein the substrate is chosen from the group consisting of glass, carbon, polymeric materials, and semiconductors.

3. The apparatus of claim 1, wherein the macro-cyclic ring has a rigid phenylethynyl backbone.

4. The apparatus of claim 1, wherein a biological or chemical probe is attached to the macro-cyclic ring such that the biological or chemical probe extends into and rests between at least a portion of the surfaces of the inner walls of the cylindrical portion of said aperture.

5. The apparatus of claim 4, wherein the biological probe comprises a single strand sequence of DNA.

6. The apparatus of claim 1, wherein the substrate comprises a layer of Silicon Nitride; a layer of Silicon, a layer of Silicon Oxide, a layer of Silicon, and a layer of Silicon Nitride.

7. A method comprising:
providing a substrate having at least one aperture having a tapered portion with a top diameter greater than the bottom diameter and wherein in each said at least one aperture, the tapered portion of said at least one aperture transitions into a cylindrical portion having a diameter equal to said bottom diameter of said tapered portion; cross-linkers attached to an inner wall of said at least one aperture; and a macro-cyclic ring, having a diameter substantially the same as the diameter of the cylindrical portion of said at least one aperture, attached at or near the circumference of one end of the cylindrical portion of said at least one aperture; and
functionalizing said aperture to bind to a specific biological or chemical moiety.

8. A method comprising:
providing a substrate having at least one aperture having a tapered portion with a top diameter greater than the bottom diameter and wherein in each said at least one aperture, the tapered portion of said at least one aperture transitions into a cylindrical portion having a diameter equal to said bottom diameter of said tapered portion; cross-linkers attached to an inner wall of said at least one aperture; and a macro-cyclic ring, having a diameter substantially the same as the diameter of the cylindrical portion of said at least one aperture, attached at or near the circumference of one end of the cylindrical portion of said at least one aperture; wherein said aperture is functionalized to bind to a specific biological or chemical moiety; and
passing a sample through said aperture while simultaneously measuring the variation in ionic current across the depth of said aperture.

9. The apparatus of claim 1, wherein the macro-cyclic ring has at least one functional group coupled thereto.

10. The apparatus of claim 1, further comprising electrodes positioned to allow measurement of a current across the aperture.

11. The apparatus of claim 10, further comprising a device coupled to the electrodes for measuring the current across the aperture.

12. The apparatus of claim 11, wherein coupling of a biological or chemical material to a functional group coupled to the macrocyclic ring causes a change in the current across the aperture, the change being detectable by the device.

13. The method of claim 7, wherein functionalizing said aperture includes coupling at least one functional group to the macro-cyclic ring.

14. The method of claim 8, wherein the macro-cyclic ring has at least one functional group coupled thereto, thereby functionalizing said aperture.

* * * * *